May 4, 1954 A. M. MacFARLAND 2,677,716
DRY CELL BATTERY
Filed April 19, 1950 2 Sheets-Sheet 2
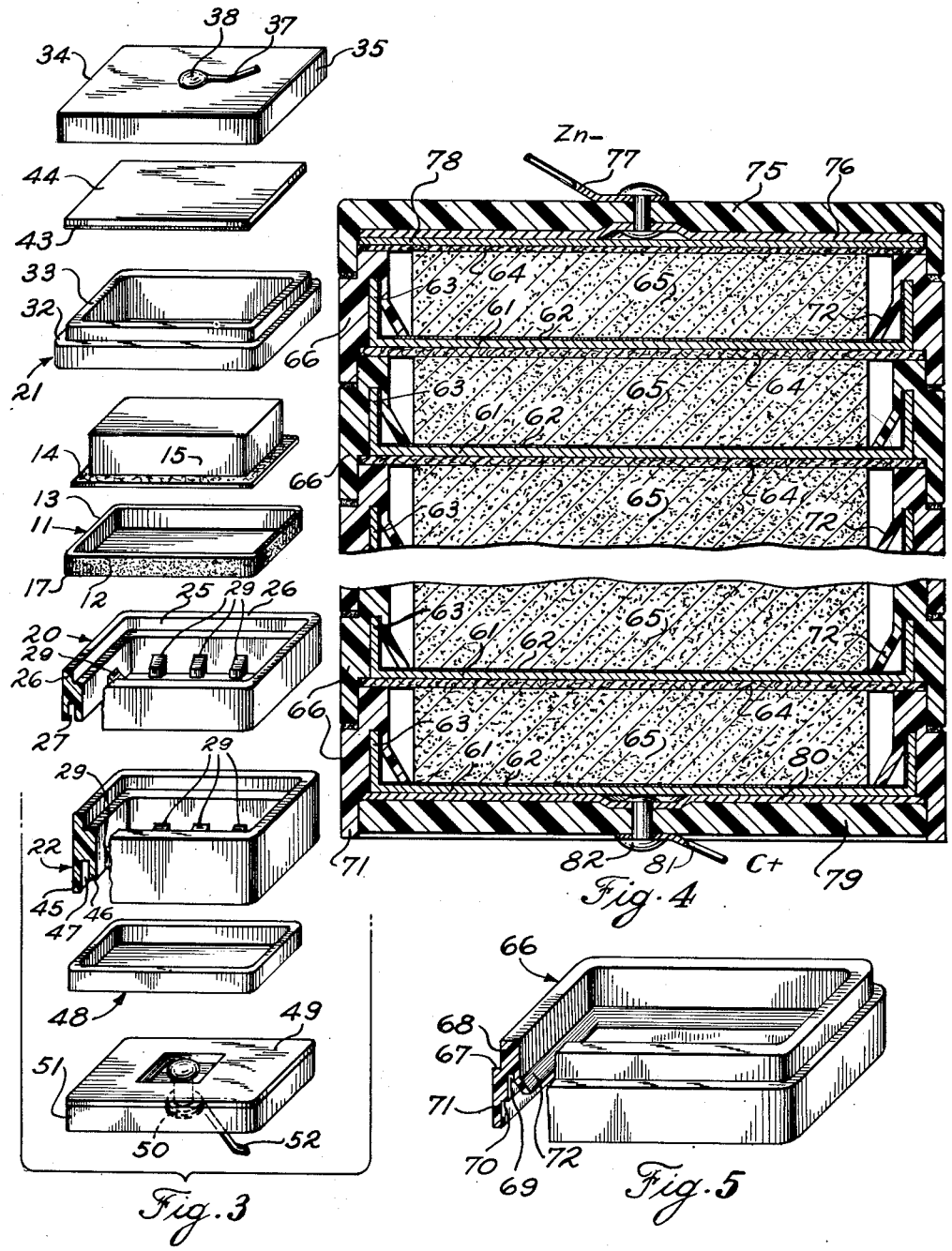
INVENTOR.
ALLISON M. MACFARLAND
BY Bosworth + Sessions
ATTORNEYS Patented May 4, 1954

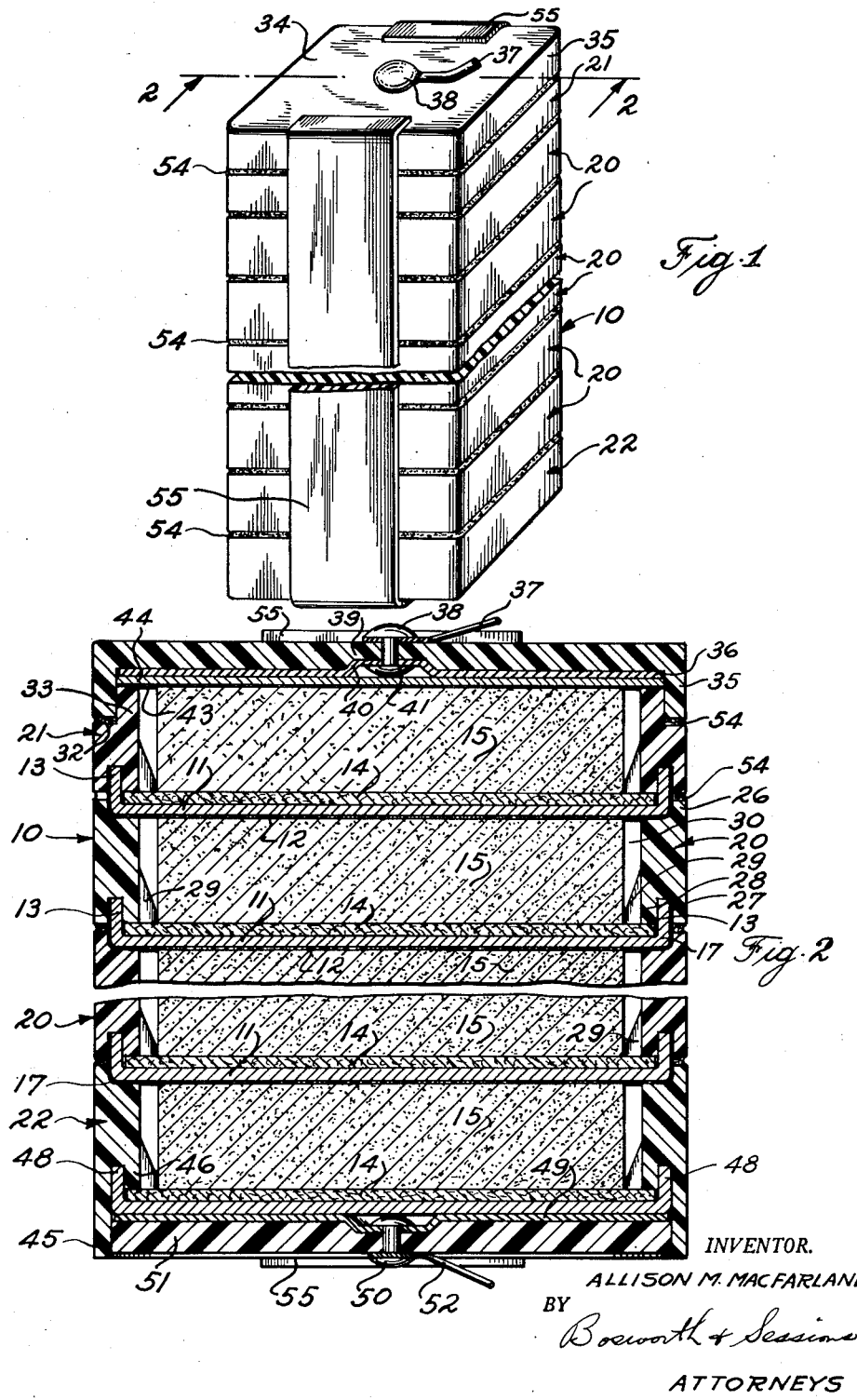

2,677,716

UNITED STATES PATENT OFFICE 2,677,716

DRY CELL BATTERY

Allison M. MacFarland, Cleveland, Ohio, assignor to General Dry Batteries, Inc., Lakewood, Ohio, a corporation of Ohio Application April 19, 1950, Serial No. 156,877

12 Claims. (Cl. 136—111)

This invention relates to dry cell batteries and more particularly to multiple cell batteries of the wafer type, i. e., comprising a stack of thin cells, batteries of this sort being used to a large extent in hearing aids, miniature radios and like services where compact batteries of relatively high voltages are required.

A general object of the present invention is the provision of compact wafer type batteries which can be manufactured at reasonable cost, which have improved capacity and life with respect to the volume they occupy and which are substantially free from troubles caused by short circuiting and leakage of fluid either to the exterior or between the cells of the battery.

Briefly, I accomplish the foregoing and other more detailed objects of the invention by providing a battery in which the several cells are separated from each other primarily by the impervious zinc anode of the cell and in which the casing enclosing the battery is made up of a series of frame members having slots fitting peripheral flanges on the zinc elements of the cells and stacked and cemented together to provide an impervious enclosure or shell.

Referring now to the drawings in which preferred forms of the invention are illustrated, Figure 1 is a perspective view of one form of battery embodying the invention; Figure 2 is a vertical sectional view of the battery shown in Figure 1; Figure 3 is an exploded view showing the several parts making up the battery of Figures 1 and 2; Figure 4 illustrates a modified form of battery; and Figure 5 is a perspective view of one of the frame members utilized in the battery of Figure 4.

Referring to Figures 1, 2 and 3 of the drawings, a battery embodying my invention is shown in general at 10 and comprises a series of cell elements stacked together in series relation to provide a battery. Only a few cells are shown in the drawings, but ordinarily the stacks are made up of 15 or more cells to provide batteries of the desired voltage.

The construction of the individual cells is apparent from Figure 2 while the parts making up the cells are shown in Figure 3. Each of the intermediate cells of the battery embodies a zinc cup 11 constituting the anode of the cell, the zinc cup being provided on its exterior with a carbonaceous coating 12 composed of varnish, lacquer or the like made conductive by the incorporation of finely divided carbon therein, the carbon coating constituting the cathode of the immediately adjacent cell. The cups are shown as being rectangular in cross-section, but it will be understood that round cups or cups of other shapes may be employed if desired. Each cup has a peripheral flange 13 extending upwardly at substantially right angles to the bottom of the cup. Within each cup 11 there is disposed a piece of battery paper 14 impregnated with electrolyte; one face of the usual mix cake 15 is in engagement with the battery paper 14 while the other face of the mix cake engages the carbonaceous coating 12 of an adjacent cup 11. Thus, each cell has the elements of a conventional Leclanché type cell.

It will be noted that the mix cake and the battery paper engage only the flat portions of the zinc cup 11 and do not cover the upstanding peripheral flanges 13 of the cups. However, the carbonaceous coating 12 is preferably extended around the entire outside of the cups including the rounded junctures 17 of the flanges 13 and the bottoms and the flanges themselves.

In order properly to space the several cups and thus to position the cells and their elements properly with respect to each other in the stack, intermediate frame members 20 and top and bottom frame members 21 and 22, respectively, are provided. The frame members are open at both ends and hence do not separate the cells. They are preferably molded of a thermoplastic insulating material that will resist the action of the electrolyte and which is capable of being cemented readily. Cellulose acetate butyrate plastics, for example, are suitable.

As shown particularly in Figure 3, each frame member 20 for the intermediate cells of the battery is recessed as at 25 at its upper end and dimensioned to fit the cup 11, the upstanding flange 26 of the frame member closely fitting the exterior of the flange of the cup. At the bottom of each frame member 20 an axially extending slot 27 is provided to receive and fit tightly the flange 17 of the cup disposed immediately beneath the frame member as shown in Figure 2. Thus, the flange 26 and the slot 27 of adjacent frame members both engage the flange 17 of the same zinc cup 11; therefore the flange 17 of the cup functions to align the frame members when the parts are assembled. It is also to be noted that, as shown in Figure 2, the inner lip 28 of the frame adjacent the slot 27 engages the marginal edges of the battery paper 14 thus holding the paper properly in place within the cup. Each frame member is also preferably provided with inwardly extending lugs 29 which function to center the mix cake 15 properly within the cell, the mix cake being dimensioned with respect to the frame member to leave a space 30 between the mix cake and the frame member to provide room for expansion of the mix cake while the battery is in service.

All of the intermediate cells in the stack making up the battery are constructed as just described. However, in order to provide terminals for the battery, the end cells of the stack are modified slightly. Thus, the top frame member 21 has a recess 32 on the exterior thereof. The recess is formed by the upwardly extending flange 33 which engages within the terminal cap 34, the depending flange 35 of the cap making a snug fit with the exterior of the flange 33. The cap 34 is preferably constructed of the same plastic material as the frame members. A zinc terminal plate 36 is secured to the cap and to the external terminal member 37 by means of a rivet 38. The cap 35 and the plate 36 are centrally indented as shown at 39 and 40 to provide space for the head 41 of rivet 38.

The carbon electrode of the uppermost cell is constituted by a carbon coating 43 on a flat zinc end plate 44, a zinc cup being unnecessary in this location. The edges of plate 44 overlie the upper surface of flange 33 and the carbon coating 43 engages the mix cake 15 of the uppermost cell in the usual manner. When the parts are assembled as shown in Figure 2, the terminal plate 36 makes contact with the zinc plate 44; thus the terminal 37 is connected with the zinc plate 44 through the rivet 38 and plate 36 and becomes the carbon or positive terminal of the battery.

In order to enclose the bottom of the battery, the bottom frame member 22 is provided with a downwardly extending flange 45 which projects beyond the shorter flange 46 on the inside of the groove 47. The lowermost cell, like the intermediate cells, embodies a mix cake 15, battery paper 14 and a zinc cup. However, the lowermost zinc cup 48 does not have a carbonaceous coating.

In order to connect the zinc cup 48 to an external circuit and to provide a terminal for the battery, a zinc terminal plate 49 is disposed in engagement with the exterior of the bottom thereof. Zinc plate 49 is secured by rivet 50 to the plastic closure disk 51 and to the external terminal 52. The disk 51 fits within the flange 46 and is secured therein to retain the zinc plate 49 in engagement with the outside of the bottom of cup 48. Plate 49 and disk 51 are centrally recessed in the same manner as the cap 35 and plate 40 to receive the head of the rivet 50.

Because of the contact between plate 49 and the cup 48 and the connection afforded by the rivet 50, the terminal member 52 becomes the zinc or negative terminal of the battery.

In assembling the parts to provide a battery, the several elements are stacked together as shown, the mix cakes being initially of slightly greater thickness than required to take up the spacing between the series of zinc cups. Then sufficient pressure is applied to the ends of the stack to bring the cell elements firmly into contact with each other, the pressure, where necessary, flattening the mix cakes slightly and at the same time expanding them laterally. While the parts are held in assembled relation, the assembly is dipped into a solution of cement such as, for example, a solution of the plastic employed to make the frame and end members in a volatile solvent. The cement then fills the spaces between the frame members, and between the upper end frame member 21 and the cap 35 and between the lower frame member 22 and the disk 51. The assembly is then removed from the cement solution and the cement permitted to harden to bond the parts into an integrally joined assembly. In some instances an additional dip may be required. In any event, in the completed battery the spaces are substantially filled with plastic cement as indicated at 54, and thus the several frame members and the cap 35 and disk 51 are welded together into a continuous electrolyte-impervious casing.

In order to reinforce the casing so provided, plastic strips 55 may be adhesively secured to opposite sides of the assembly, the strips extending around the ends of the assembly into engagement with the cap 35 and disk 51 as shown.

By this construction, a simple and compact battery is provided. Inasmuch as the frame members are welded together into an impervious and strong casing, the need for a separate enclosure for the battery is eliminated, and thus the active elements of the battery can be increased in size with respect to the volume occupied by the battery; this is an important factor in batteries for small hearing aids and miniature radios where space is at a premium. In the assembling operation, the cement not only secures the frame members to each other but also bonds the frame members to the carbonaceous coatings on the zinc cups, these coatings being composed of a varnish or lacquer compatible with the cement, and preferably embodying the same plastic or resinous material as the cement and the frame members. Thus, the barrier to the passage of electrolyte from one cell to another around the edges of the zinc cups provided by the interfitting of the flanges of the cups within the grooves of the frames is enhanced by the adhesive bond between the cups and the frame members. The zinc cups themselves provide the required impervious barrier throughout the active areas of the cells. By this construction, the need for electrolyte-proof wrappings, integuments and the like for the individual cells is eliminated, resulting in a further gain in space for the active components of the cells, making the assembly of the cells a comparatively simple matter and reducing the cost of materials required for the battery.

Figure 4 of the drawings illustrates a battery embodying a modified form of the invention. In this modification the arrangement of the elements of the cells is inverted as compared to the previous modification in that the carbonaceous coatings are on the interior of the zinc cups, and the sheets of battery paper are on the exterior. Batteries of this general type are described and claimed in the Rock Patent No. 2,475,152 issued July 5, 1949, and assigned to the assignee of the present application. The battery of Figure 4 is further modified in the construction of the frame members which telescope one within the other to provide the casing. Those skilled in the art will appreciate that either of these departures from the previously described modification may be used without the other.

The cells of the battery of Figure 4 each embody a zinc cup 61 having an internal carbonaceous coating 62 composed of the material previously described, and an upstanding peripheral flange 63. The exterior of the bottom of each zinc cup, except for the lowermost one, is engaged by one or more layers of battery paper 64, and mix cakes 65 are disposed within each cup.

In order to support and space the elements properly and to provide a casing for the assembled stack of cells, frame members 66 are employed. These are preferably molded of materials of the same character as previously described for the frame members 21, and each frame member, as shown particularly in Figure 5, embodies an external shoulder 67, an upwardly projecting flange 68, an axially extending groove or slot 69 to receive the upstanding flange 63 of a zinc cup, an internal shoulder 70 adjacent the end of the slot 69, a downwardly extending flange 71 and an inwardly slanting lip 72 defining the lower portion of the inner wall of the slot 69.

When the parts are assembled, the flanges 63 of the zinc cups fit tightly within the grooves 69 while the slanting lips 72 resiliently engage the carbonaceous coatings on the interior of the cups. The downwardly extending flanges 71 of each of the frame members, except the lowermost one, encompass and snugly engage the upwardly extended flanges 68 of the adjacent frame members.

The mix cakes 65 are centered within the cells by the lips 72 while the upper surfaces of the mix cakes engage the battery paper 64, the peripheral edges of which lie beneath the internal shoulders 70 and on top of the flanges 68 of adjacent frame members.

At the top of the cell a cap 75, identical in all material respects to the cap 35 previously described, engages the flange 68 of the uppermost frame member 66 and supports the zinc contact plate 76 and terminal 77. In this case, however, the contact plate 76 engages a zinc plate 78 which constitutes the anode of the uppermost cell, the lower surface of the plate 78 being engaged by battery paper 64. Thus in this form of the invention, the terminal 77 becomes the zinc or negative terminal of the battery.

The terminal at the bottom of the battery is provided by a plastic disk 79 similar to the disk 51 heretofore described and carrying the zinc terminal plate 80 and terminal 81. The disk 79 fits snugly within the depending flange 71 of the lowermost frame member 66, and the zinc plate 80 makes contact with the exterior of the lowermost zinc cup 61. Inasmuch as cup 61 has a carbon coating 62 on it, the terminal 81 is in electrical circuit with the carbon coating 62 through the cup 61, plate 80 and rivet 82. Thus the terminal 81 becomes the carbon or positive terminal of the battery.

Batteries made according to this form of the invention are assembled by positioning the elements as shown in Figure 4, compressing the parts together to insure contact and then dipping the assembly in a cement bath as previously described. It will be noted that the dimensions of the parts are such that the ends of the depending flanges 71 do not quite engage the shoulders 67 of adjacent frame members. This spacing permits the application of the desired pressure to the elements and allows for slight variations in dimensions. Furthermore, the presence of the space permits the cement to penetrate and to bond firmly the telescoping surfaces of the adjacent frame members.

Because the frame members telescope together, it is ordinarily necessary to dip the assembly in the cement only once and reinforcing plastic strips are not required. In this type of battery, the zinc cups provide the barrier to prevent travel of electrolyte from one cell to another, the tight fit between the flanges of the zinc cups and the slots in which they are inserted effectively blocking the travel of electrolyte around this path, although the cups may be cemented in the grooves if desired.

The lips 72 of the frame members resiliently engage the carbonaceous coatings 62 and not only effectively center the mix cakes, leaving space around them for expansion, but also prevent fragments of mix cake from reaching the grooves in which the flanges of the zinc cups are disposed and effectively insulate the edges of the zinc cups which are not coated with carbon from contact with the mix cakes. Thus, short circuiting of the battery is prevented. The batteries of this modification have substantially the same advantages of compactness, reasonable cost, high capacity per unit of volume and reliability as the previously described form of the invention.

Those skilled in the art will appreciate that further changes and modifications can be made in the invention without departing from the spirit or scope thereof. It is therefore to be understood that the descriptions of preferred forms of the invention appearing herein are given by way of example and not by way of limitation. It is intended that the patentable features of the invention shall be covered by the appended claims.

I claim:

1. A dry cell battery of the Leclanché type embodying a plurality of groups of cell elements arranged in series stacked relation, each group including an electrolyte-containing element and a zinc cup electrode having a substantially flat bottom and an upstanding peripheral flange, and a casing for said battery, said casing being made up of a plurality of unitary, separately formed frame members composed of electrolyte-impervious insulating material, there being a frame member associated with each zinc cup, each frame member being open-ended and having an axially extending slot receiving the peripheral flange of its associated zinc cup and having substantially liquid-tight engagement therewith, the bottoms of adjacent zinc cups being spaced apart a distance greater than the height of the upstanding peripheral flanges thereof, each frame member having at its end opposite its said slot means for urging the zinc cup of an adjacent group into the slot of an adjacent frame member, the said frame members being secured together and said zinc cups acting as barriers to prevent intermingling of electrolyte of adjacent cells.

2. A dry cell battery of the Leclanché type embodying a plurality of groups of cell elements arranged in series stacked relation, each group including an electrolyte-containing element and a zinc cup electrode having conductive carbonaceous coating thereon and having a bottom and an upstanding peripheral flange, and a casing for said battery, said casing being made up of a plurality of unitary, separately formed frame members composed of electrolyte-impervious insulating material, there being a frame member associated with each zinc cup, each frame member being open-ended and having an axially extending slot at one end receiving the peripheral flange of its associated zinc cup and having a shoulder and a flange at the other end defining a recess that receives the juncture of the bottom and the flange of the zinc cup of an adjacent cell, the bottoms of adjacent zinc cups being spaced apart a distance greater than the height of the upstanding peripheral flanges thereof, the said frame members being bonded together into a unitary electrolyte-impervious casing structure and said zinc cups acting as barriers to prevent intermingling of electrolyte of adjacent cells.

3. A dry cell battery according to claim 2 wherein the carbonaceous coatings are on the exterior of the zinc cups.

4. A dry cell battery according to claim 3 wherein the carbonaceous coatings on the zinc cups are adhesively bonded to the frame members with which they are in engagement.

5. A dry cell battery according to claim 4 wherein the ends of adjacent frame members are spaced slightly, the spaces being filled with the cement that bonds the frame members together and to the carbonaceous coatings.

6. A dry cell battery according to claim 2 wherein the carbonaceous coatings of the zinc cups are adhesively bonded to the frame members.

7. A dry cell battery according to claim 2 wherein each group of cell elements includes a mix cake and wherein the frame members are provided with spaced inwardly extending portions for centering the mix cakes and spacing them from the interior walls of the frame members.

8. A dry cell battery of the Leclaché type embodying a plurality of dry cells arranged in stacked relation, each cell comprising a zinc cup constituting an electrode and having a bottom and a peripheral flange extending substantially at right angles thereto, a sheet of battery paper impregnated with electrolyte engaging the zinc cup, a mass of mix and a carbon electrode, and a unitary, separately formed open-ended frame member composed of insulating material and having an axially extending groove in one end thereof into which the peripheral flange of a zinc cup is inserted, the opposite end of the frame member being recessed to receive the juncture of the bottom and the flange of another zinc cup so that the frame members are aligned by engagement with the zinc cups, the bottoms of adjacent zinc cups being spaced apart a distance greater than the height of the upstanding peripheral flanges thereof, the frame members being secured together and to the zinc cups.

9. A battery according to claim 8 wherein the carbon electrodes are constituted by carbonaceous coatings on the exterior of the cups, the frame members being adhesively bonded to the coatings.

10. A dry cell battery of the Leclanché type embodying a plurality of groups of cell elements arranged in series stacked relation, each group including a cup-shaped zinc electrode having a bottom and a peripheral flange extending substantially at right angles thereto, a conductive carbonaceous coating on the exterior of the bottom and flange of the electrode, a sheet of battery paper impregnated with electrolyte and engaging the interior of the bottom of the zinc electrode, a mix cake engaging the battery paper and unitary separately formed self-supporting open-ended frame member composed of insulating material and having an axially extending groove in one end thereof into which the peripheral flange of the zinc electrode is inserted and having at its end opposite said groove means for urging the zinc electrode of an adjacent group into the groove of an adjacent frame member, the frame member having a radial surface engaging the marginal edge portions of the battery paper throughout substantially the entire periphery of the battery paper and having inwardly extending lugs for spacing and centering the mix cake within the frame member, the frame members of the several cells being bonded together into a unitary electrolyte-impervious casing structure.

11. A dry cell battery of the Leclanché type embodying a plurality of groups of cell elements arranged in series stacked relation, each group including a cup-shaped zinc electrode having a bottom and a peripheral flange extending substantially at right angles thereto, a conductive carbonaceous coating on the bottom of the zinc electrode, a sheet of battery paper impregnated with electrolyte and engaging the side of the bottom of the zinc electrode opposite the carbonaceous coating, a mix cake engaging the battery paper and unitary separately formed self-supporting open-ended frame member composed of insulating material and having a groove in one end thereof into which the peripheral flange of the zinc electrode is inserted and having at its end opposite said groove means for urging the zinc electrode of an adjacent group into the groove of an adjacent frame member, the frame member having a surface engaging the marginal edge portions of the battery paper and a portion centering the mix cake within the periphery of the battery paper, the frame members of the several cells being bonded together into a unitary electrolyte-impervious casing structure.

12. In a dry cell battery of the Leclanché type embodying a series of cells stacked together, each cell having an electrolyte-containing element a zinc cup electrode with an axially extending peripheral flange, an impervious casing for the battery comprising a series of annular frame members composed of electrolyte-impervious insulating material, the frame members being adhesively sealed together and each frame member having an axially extending slot receiving the peripheral flange of one of the zinc cups and each frame member having at its end opposite its said slot means for urging the zinc cup of an adjacent cell into the slot of an adjacent frame member, end closure members composed of electrolyte-impervious insulating material and bonded to the frame members at the ends of the battery, and terminals for the battery secured to said closure members.

References Cited in the file of this patent

UNITED STATES PATENTS

| Number | Name | Date |
|---|---|---|
| 2,081,926 | Gyuris | June 1, 1937 |
| 2,144,574 | MacCallum | Jan. 17, 1939 |
| 2,418,442 | Wiencke | Apr. 1, 1947 |
| 2,475,153 | Rock | July 5, 1949 |
| 2,483,983 | Quinnell | Oct. 4, 1949 |
| 2,496,709 | Gelardin | Feb. 7, 1950 |
| 2,521,800 | Martinez et al. | Sept. 12, 1950 |
| 2,594,047 | Martinez | Apr. 22, 1952 |

FOREIGN PATENTS

| Number | Country | Date |
|---|---|---|
| 621,280 | Great Britain | Apr. 6, 1949 |
| 623,890 | Great Britain | May 24, 1949 |